United States Patent
Park

(10) Patent No.: US 6,229,775 B1
(45) Date of Patent: May 8, 2001

(54) DRIVING METHOD AND APPARATUS FOR DRIVING LIGHT SOURCE ELEMENT INDEPENDENT OF A DRIVING MODE OF AN OPTICAL PICKUP

(75) Inventor: Jong-ho Park, Suwon (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 08/225,322

(22) Filed: Apr. 8, 1994

(30) Foreign Application Priority Data

Jun. 18, 1993 (KR) .................................................. 93-11210

(51) Int. Cl.$^7$ ................................................ G11B 7/0045
(52) U.S. Cl. ..................................... 369/47.52; 369/53.18; 369/53.28; 369/53.37
(58) Field of Search ............................. 369/44.25, 44.27, 369/44.29, 44.31, 44.32, 44.33, 44.35, 44.39, 54, 116, 47, 50

(56) References Cited

U.S. PATENT DOCUMENTS 4,554,652 * 11/1985 Maeda et al. ...................... 369/44.33
4,669,072 * 5/1987 Miura et al. ................... 369/44.33 X
4,982,392 * 1/1991 Soejima ........................ 369/44.33 X
5,181,194 * 1/1993 Horie ............................ 369/44.33 X
5,251,194 * 10/1993 Yoshimoto et al. ........... 369/44.34 X
5,351,225 * 9/1994 Ishida et al. .................. 369/44.35 X

* cited by examiner

*Primary Examiner*—W. R. Young
(74) *Attorney, Agent, or Firm*—Sughrue, Mion, Zinn, Macpeak & Seas, PLLC

(57) ABSTRACT

A driving method and apparatus for a light source element of an optical pickup for reading and writing data from and to an optical data includes generating an error signal when a tracking error signal is higher than a first level or is lower than a second level and, if the error signal is active, supplying the light source element with a driving signal suitable for data read operations independent of whether the user selects read mode or write mode. As a result, when there is a tracking error the power of the device signal corresponds to that normally presented during a read mode, and this power is insufficient to write data onto the disc. Thus, data is not written over other desired data when an abnormal tracking error occurs.

1 Claim, 11 Drawing Sheets

DRIVING METHOD AND APPARATUS FOR DRIVING LIGHT SOURCE ELEMENT INDEPENDENT OF A DRIVING MODE OF AN OPTICAL PICKUP

BACKGROUND OF THE INVENTION

The present invention relates to a driving method and apparatus for a light source element such as a laser diode, which is included in an optical pickup that performs data read/write operations for an optical disc.

Generally, optical discs have a helical track. Using a light source element such as a laser diode, recorded data is read out from or recorded in the track. The optical pickup provided with the light source element should correctly trace the track during the reading or recording of data. This is called tracking, and a tracking error signal is generated for tracking control. If a tracking error occurs during a data reading mode, the wrong data is read out. If a tracking error occurs during a writing mode, the data is recorded at the wrong position.

If the wrong data is read out, that data is abandoned, and the tracking operation is again performed for reading out the desired data. However, in the case of a writing mode, the data may be recorded at a position where other data has already been recorded, thereby losing data.

FIG. 1 is a block diagram illustrating a conventional driving apparatus for a light source element. The conventional apparatus includes a mode selector 101, a reference power data generator 102 and a drive signal generator 103.

In FIG. 1, mode selector 101 is for selecting the driving mode of an optical pickup and generates a mode signal M based on user manipulation. For example, the mode signal M may be a logic "low" when the driving mode is set for reading data and may be a logic "high" when the driving mode is set for writing data. Reference power data generator 102 generates reference power data PREF in accordance with mode signal M. Generally, a light source element requires less power for read operations than for writing. Besides varying in accordance with the driving mode, the power required for driving the light source element also varies according to the kind of optical disc used for reading/writing the data. Therefore, the reference power data suitable for a given optical disc should be recorded in the disc's lead-in area. Accordingly, based on the data read out from the optical disc, reference power data generator 102 generates reference power data which, in accordance with mode signal M, is either for a reading mode or for a writing mode. In other words, reference power data generator 102 generates a read reference power data for reading and a write reference power data for writing. The reference power data PREF is applied to drive signal generator 103 where it is converted into a driving signal DR and then applied to a light source element such as a laser diode installed in the optical pickup.

As described above, in the conventional driving apparatus of a light source element, the light source element is operated at a constant power irrespective of pickup position. Thus, even if the optical pickup is disposed in an incorrect position due to poor tracking, which may result from incorrect operation of the driving apparatus, an external impulse signal, minor impacts, disc imperfections, dust on the disc, etc., the light source element maintains a constant power level. Therefore, if a tracking error occurs during writing, the previously recorded data is lost by overwriting additional data.

SUMMARY OF THE INVENTION

Accordingly, the object of the present invention is to provide a driving method for a light source element which alleviates the above problems.

The other object of the present invention is to provide a driving apparatus for a light source element which performs the above driving method.

To attain the object, the present invention provides a driving method for a light source element included in an optical pickup, comprising the steps of discriminating whether tracking error occurs, based on a tracking error signal generated in accordance with the movement of the optical pickup; and supplying the light source element with a driving signal having a level suitable for a data read operation irrespective of the driving mode of the optical pickup, when tracking error occurs; wherein the discriminating step further comprises a step for generating an error signal activated when a tracking error signal based on the movement of the optical pickup is higher than a first level or lower than a second level which is lower than the first level.

The driving method of the invention further includes the steps of detecting address data from the data read from the optical disc by the optical pickup and determining whether the detected address data corresponds to a desired address; and, if the detected address data corresponds to a desired address, converting the state of the error signal into a nonactive state.

To attain the other object of the invention, the driving apparatus for a light source element included in an optical pickup according to one aspect of the present invention, comprises: a mode selector for generating a mode signal corresponding to a user-selected read/write mode;

a reference power data generator for detecting write reference power data and read reference power data from the data read out from the optical disc, and outputting the detected data;

a first drive signal generator for generating a reading drive signal based on said read reference power data;

a second drive signal generator for generating a writing drive signal based on said write reference power data;

an error discriminator for receiving a tracking error signal generated in accordance with the movement of the optical pickup, and for generating an error signal which is active when tracking error occurs; and a selector for selecting the reading drive signal if the error signal is active and otherwise selecting between the reading drive signal and the writing drive signal based on the mode signal, and supplying the light source element with the selected drive signal.

According to the preferred embodiment, the driving apparatus further includes a position discriminator for discriminating whether the optical pickup is located at a desired position based on the data read from the optical disc, wherein, if the optical pickup is located at a desired position, the error signal is converted into a nonactive state.

The error discriminator generates an error signal activated when the tracking error signal is higher than a predetermined first level or lower than a predetermined second level which is lower than the first level. The error discriminator comprises a first comparator for comparing the tracking error signal with the first level; a second comparator for comparing the tracking error signal with the second level; an OR gate for performing a logic OR operation with the output of the first comparator and the output of the second comparator; and a D flip-flop whose clock input port receives the output of the OR gate and whose data input port is coupled a supply voltage, which is reset by the output of the position discriminator.

The selector includes a logic operator for receiving the error signal and the mode signal to produce a selecting signal; and a multiplexer for selecting one between the outputs of the first and second drive signal generators in accordance with the output of the logic operator.

To attain the other object, the driving apparatus for a light source element included in an optical pickup according to another aspect of the present invention, includes a mode selector for generating a mode signal corresponding to a user-selected read/write mode;

a reference power data generator for generating a first reference power data whose level is varied in accordance with the mode signal and based on the data read out from the optical disc, and a second reference power data which is generated irrespective of the mode signal and is suitable for data read operations;

a first drive signal generator for generating a first driving signal based on the first reference power data;

a second drive signal generator for generating a second driving signal based on the second reference power data;

an error discriminator for receiving a tracking error signal generated in accordance with the movement of the optical pickup and for generating an error signal activated when tracking error occurs; and a selector for selecting the second driving signal if the error signal is active and otherwise selecting the first driving signal, and supplying the light source element with the selected one.

If tracking error occurs, the power of the light source element such as a laser diode loaded in an optical pickup is converted into one suitable for the read mode, because the read-mode power level is typically much lower than that for writing mode and is insufficient for overwriting previously recorded data, thereby preventing the loss of data.

BRIEF DESCRIPTION OF THE DRAWINGS

The above objects and other advantages of the present invention will become more apparent by describing in detail a preferred embodiment thereof with reference to the attached drawings in which.

DETAILED DESCRIPTION OF THE INVENTION

Figure 2:
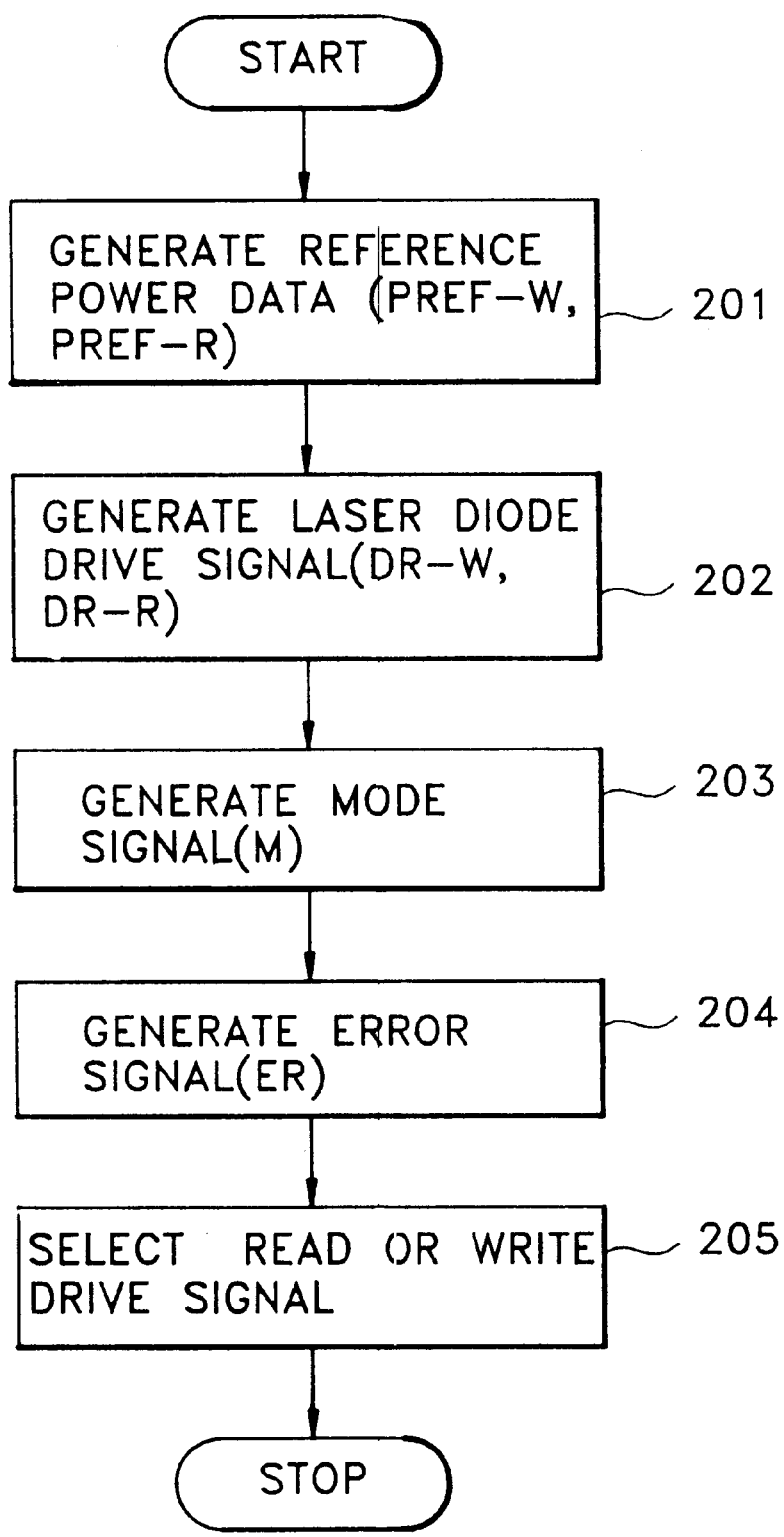
FIG. 2 is a flow chart illustrating a driving method for light source element according to one embodiment of the present invention.

FIG. 2 is a flow chart illustrating a driving method for light source element according to one embodiment of the present invention.

In FIG. 2, step 201 is for generating reference power data PREF-R and PREF-W suitable for read and write modes, based on the data read out from an optical disc by the optical pickup. In step 202, a reading drive signal DR-R and a writing drive signal DR-W are generated based on the reference power data PREF-R and PREF-W generated in step 201.

In step 203, a mode signal M is generated based on user manipulation. Step 204 is for generating an error signal ER which is activated when a tracking error signal is higher than a predetermined first level or lower than a predetermined second level causing an abnormal tracking error. Here, the tracking error signal is a sinusoidal waveform generated in accordance with the movement of the optical pickup. If the optical pickup moves abnormally (e.g., due to an external impulse or similar malfunction), the waveform of the tracking error signal has peak values which are higher than a first level or lower than a second level. Here, the first level is higher than the second level and the first level is substantially equal to the maximum level that is allowed to the tracking error signal when the tracking error doesn't occur. Meanwhile, the second level is substantially equal to the minimum level that is allowed to the tracking error signal when the tracking error doesn't occur. Accordingly, the error signal ER is converted into active, when the tracking error occurs.

Step 205 is for selecting between the reading drive signal DR-R and the writing drive signal DR-W so as to apply the selected drive signal to the light source element. If the error signal ER is active, the reading drive signal DR-R is selected, and if the error signal ER is nonactive, the selection is performed in accordance with the mode signal M. In other words, if the error signal ER is nonactive and mode signal M indicates a read mode, the reading drive signal DR-R is selected, and if the error signal ER is nonactive and the mode signal M indicates a write mode, the writing drive signal DR-W is selected.

Therefore, when a tracking error occurs, the optical pickup is operated at a power level suitable for reading data, which is insufficient for overwriting already recorded data, and thus prevents the unwanted loss of data.

Figure 3:
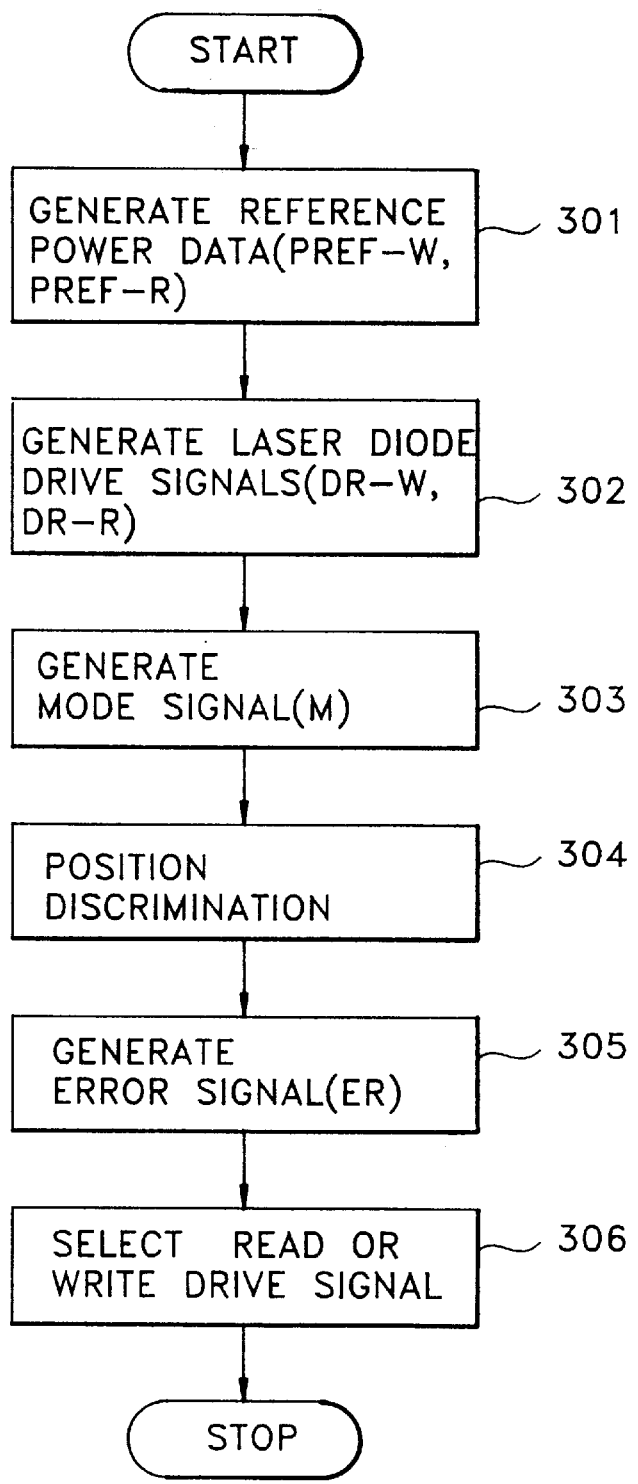
FIG. 3 is a flow chart illustrating a driving method for light source element according to another embodiment of the present invention.

FIG. 3 is a flow chart illustrating a driving method for a light source element according to another embodiment of the present invention. In FIG. 3, step 301 through step 303 correspond to step 201, through step 203 of FIG. 2. Step 304 is for discriminating whether the optical pickup is located at a desired position, so as to generate a reset signal which is active when the optical pickup is located at the desired position. This discrimination is made based on the data read out from the optical disc by the optical pickup. In more detail, the discrimination is accomplished by detecting address data from the data read from the optical disc by the optical pickup and then determining whether the obtained address data corresponds to a desired address.

Step 305 is for generating an error signal ER. Here, the error signal ER is active when the tracking error signal is higher than the first level or lower than the second level. The error signal ER is returned to the nonactive state by the reset signal of step 304.

Step 306 is for selecting between the reading drive signal DR-R and the writing drive signal DR-W, so as to apply the selected drive signal to the light source element. The selection is performed in accordance with the following Table 1.

TABLE 1

| mode signal (M) | error signal (ER) | drive signal (DR) |
|---|---|---|
| read mode | X | reading drive signal (DR-R) |
| write mode | nonactive | writing drive signal (DR-W) |
| write mode | active | reading drive signal (DR-R) |

Accordingly, as previously stated, if an abnormal tracking error occurs, the optical pickup is operated at a power level suitable for the read mode which is much lower than that of the write mode and is thus insufficient for overwriting data. Therefore, the above driving method prevents the already recorded data from being lost by overwriting.

Figure 4:
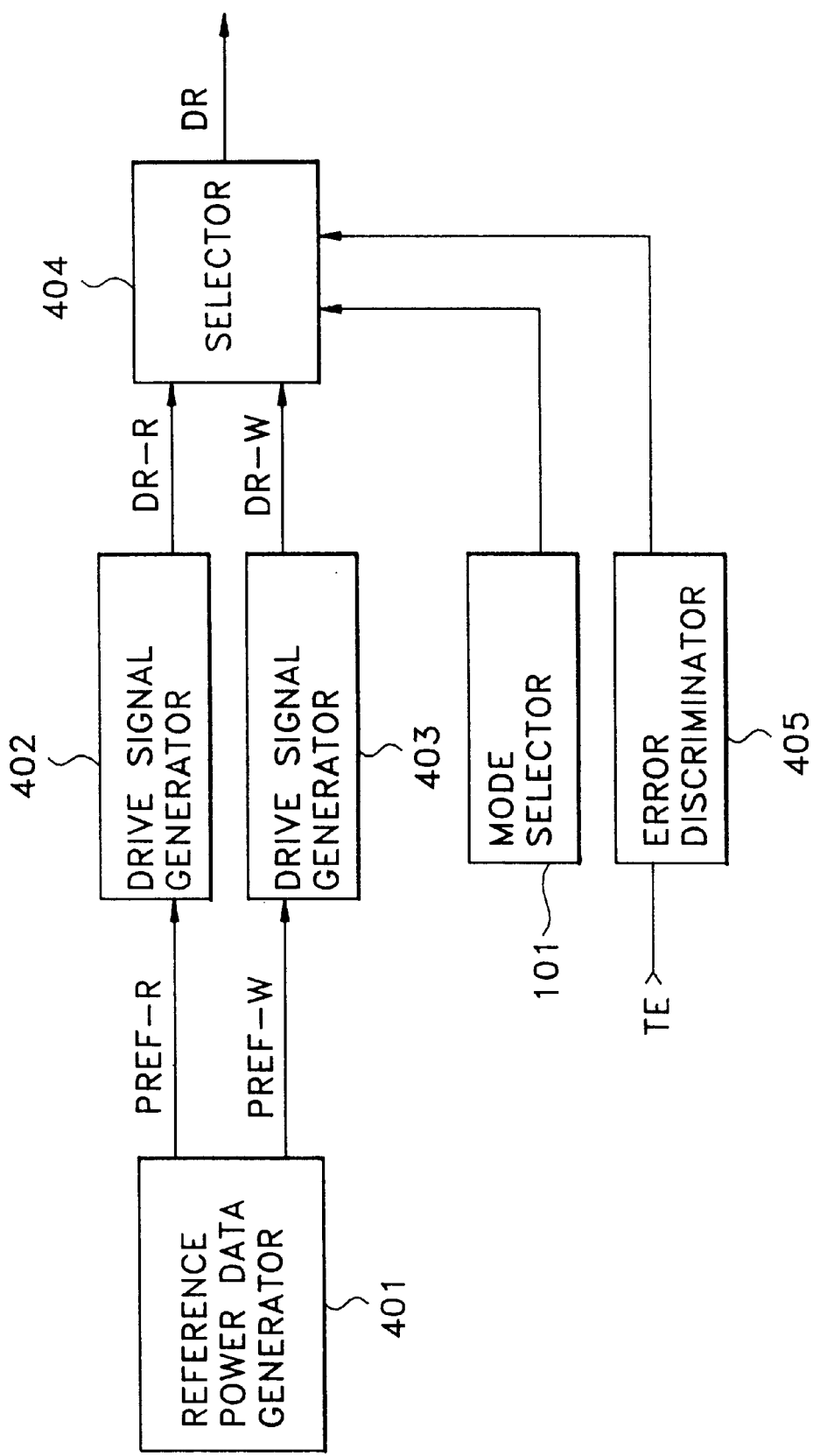
FIG. 4 is a block diagram illustrating a driving apparatus for light source element according to one embodiment of the present invention.

FIG. 4 is a block diagram illustrating a driving apparatus for a light source element according to one embodiment of the present invention, wherein the driving apparatus includes a reference power data generator 401, two drive signal generators 402 and 403, a selector 404, a mode selector 101 and an error discriminator 405.

In FIG. 4, from the data read out from an optical disc, reference power data generator 401 detects a read reference power data PREF-R for reading data and a write reference power data PREF-W for writing data. Two driving signal generators 402 and 403 convert the read reference power data PREF-R and the write reference power data PREF-W into a reading drive signal DR-R and a writing drive signal DR-W, respectively. Mode selector 101 produces a mode signal M representing the user-selected mode, which is either the read mode or the write mode. Error discriminator 405 receives the tracking error signal TE and then produces an active error signal ER when the tracking error signal is higher than a first level or lower than a second level.

The error discriminator 405 produces an error signal ER, which is active when the tracking error signal TE is higher than a first level or lower than a second level. In other words, when the level of the tracking error signal is between the first and second levels, the error signal ER is in a non-active state. Accordingly, error discriminator 405 can be implemented with two comparators and a logic OR gate.

Selector 404 selects the reading drive signal DR-R or the writing drive signal DR-W, in accordance with the mode signal M and error signal ER, and then applies the selected one to the light source element as a driving signal. Here, the selection is made as represented in Table 1.

Figure 5:
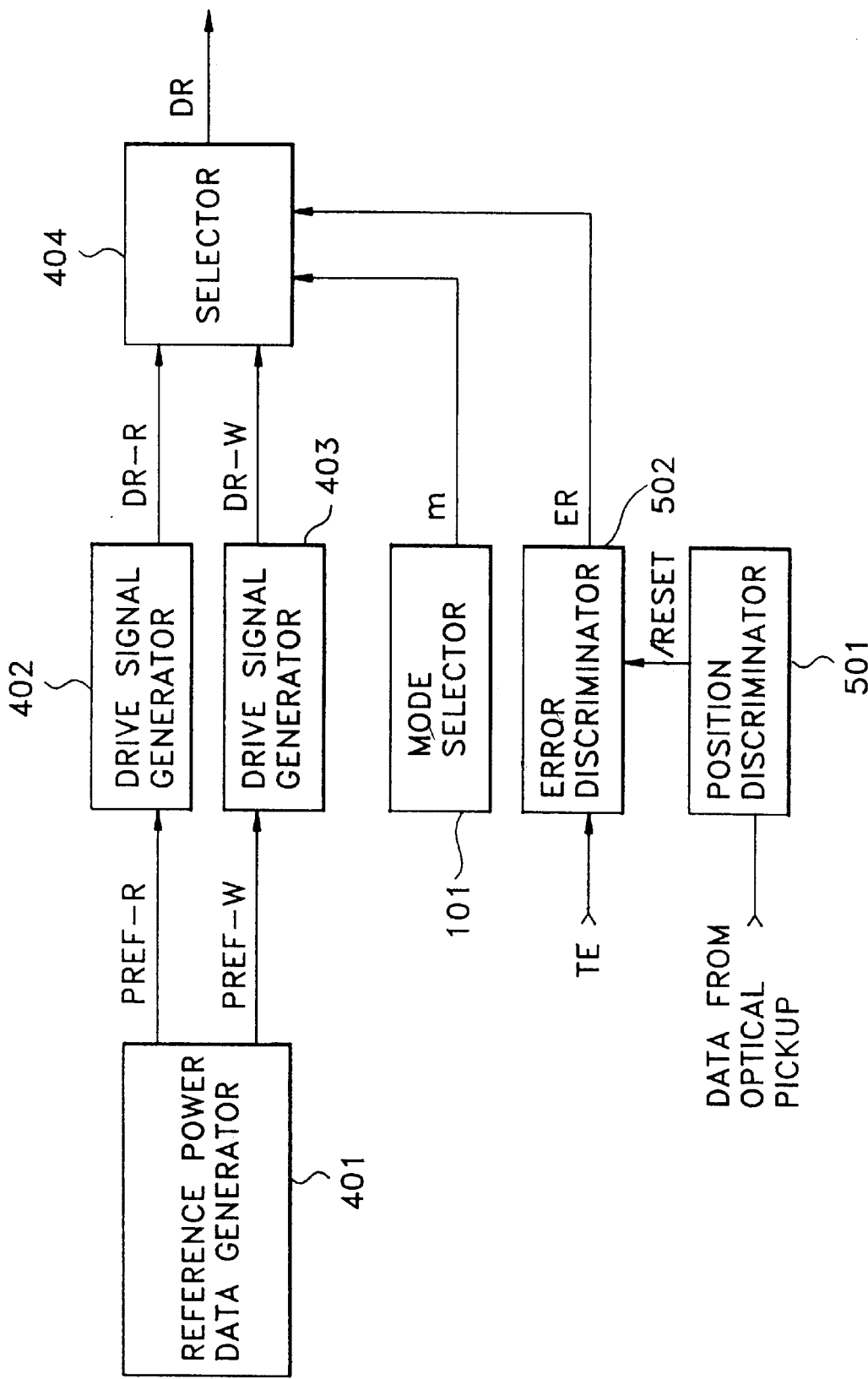
FIG. 5 is a block diagram illustrating a driving apparatus for light source element according to another embodiment of the present invention.

FIG. 5 is a block diagram illustrating a driving apparatus for a light source element according to another embodiment of the present invention, which includes a reference power data generator 401, two drive signal generators 402 and 403, a selector 404, a mode selector 101, an error discriminator 502 and a position discriminator 501. In FIG. 5, reference power data generator 401, two drive signal generators 402 and 403, selector 404 and mode selector 101 are equivalent to those explained with respect to FIG. 4.

Position discriminator 501 detects an address from the data read out from the optical disc by the optical pickup and then discriminates whether the address is the desired address, to determine whether the pickup is located at the desired position. Therefore, position discriminator 501 generates a reset signal, RESET, which is active when the optical pickup is located at the desired position, and supplies the generated reset signal to error discriminator 502. Error discriminator 502 generates an error signal ER which is active when the reset signal, RESET, is nonactive and the tracking signal is higher than the first level or lower than the second level and which is nonactive when the reset signal, RESET, is active.

Figure 6:
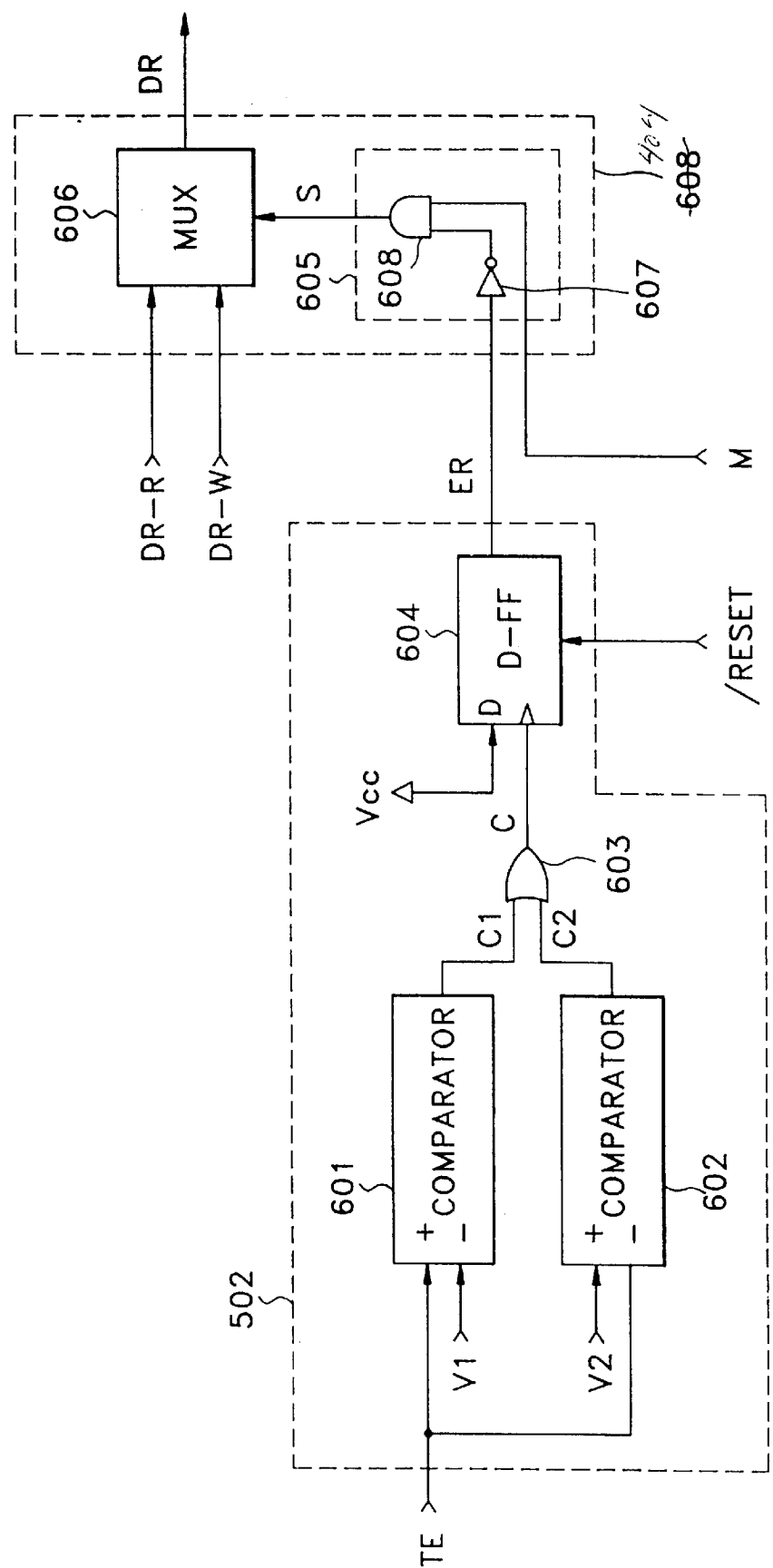
FIG. 6 is a detailed block diagram illustrating one embodiment of the error discriminator and selector shown in FIG. 5.

FIG. 6 is a detailed block diagram illustrating one embodiment of the error discriminator and selector shown in FIG. 5. Error discriminator 502 includes two comparators 601 and 602, an OR gate 603 and a D flip-flop 604, and selector 404 includes a logic operator 605 and a multiplexer 606. Logic operator 605 includes an inverter 607 and an AND gate 608.

The comparator 601 compares the tracking error signal TE with the first level V1 and generates a signal C1 which is active when the tracking error signal TE is higher than the first level V1. Comparator 602 compares the tracking error signal TE with the second level V2 and generates a signal C2 which is active when the tracking error signal TE is lower than the second level V2. OR gate 603 performs a logic OR operation on the outputs of comparators 601 and 602, and supplies the result to the clock port of D flip-flop 604. The data input port of D flip-flop 604 is tied high, i.e., to a power source voltage, so the error signal ER of the output of D flip-flop 604 is converted into the active state or logic "1" state, by the application of one clock pulse to the clock input port. Also, D flip-flop 604 is reset by the reset signal, RESET, applied from position discriminator 501.

The inverter 607 included in logic part 605 inverts the error signal ER, and AND gate 608 performs a logic AND operation with the inverted error signal $\overline{ER}$ and the mode signal M so as to produce selecting signal S. Multiplexer 606 selects between reading drive signal DR-R and writing drive signal DR-W in accordance with the selecting signal S and supplies the selected one to the light source element.

Figure 7:
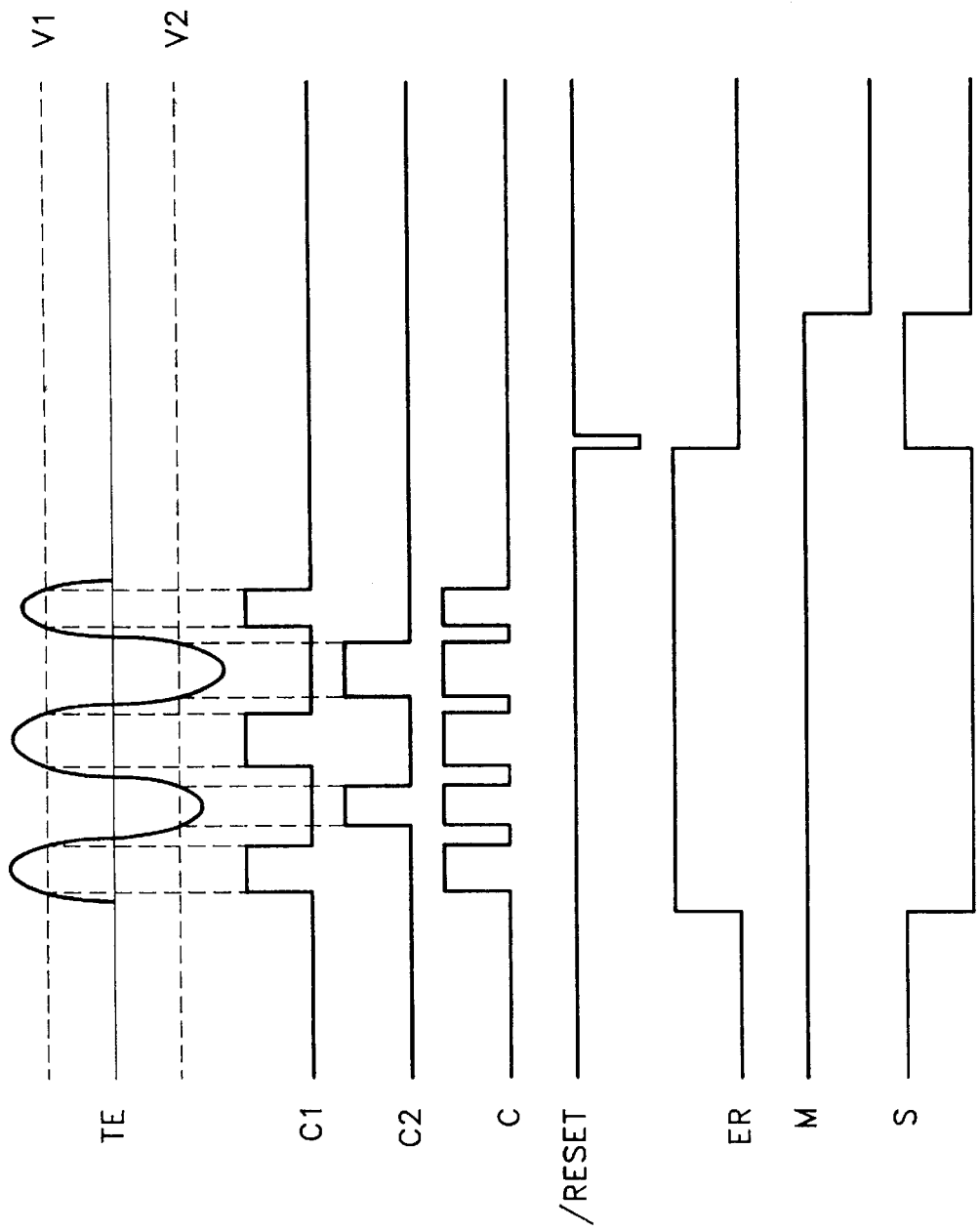
FIG. 7 illustrates the various waveforms present throughout the components shown in FIG. 6.

FIG. 7 illustrates various waveforms present at points throughout the circuit shown in FIG. 6, wherein TE represents the tracking error signal, C1 represents the output of comparator 601, C2 represents the output of comparator 602, and C represents the output of OR gate 603. Here, signals C1, C2 and C are active high signals, RESET represents the reset signal which is an active low signal, and ER represents the error signal which is an active high signal. Also, M is a mode signal which is "high" for the write mode and "low" is for the read mode, and S is a selecting signal. Multiplexer 606 selects the reading drive signal DR-R when the selecting signal S is "low," and selects the writing drive signal DR-W when the selecting signal S is "high."

It can be seen from FIGS. 6 and 7 that whenever the signal ER is high, indicating an abnormal tracking error, the output S from gate 608 will be low, thereby selecting a read signal drive DR-R. Whenever M is low, indicating a user selected read mode, the output S will be low, thereby selecting a read signal drive DR-R. But if the mode signal M is high, indicating a write mode, and the signal ER is low, indicating no tracking error, S will be high and the write drive signal DR-W will be selected.

Figure 8:
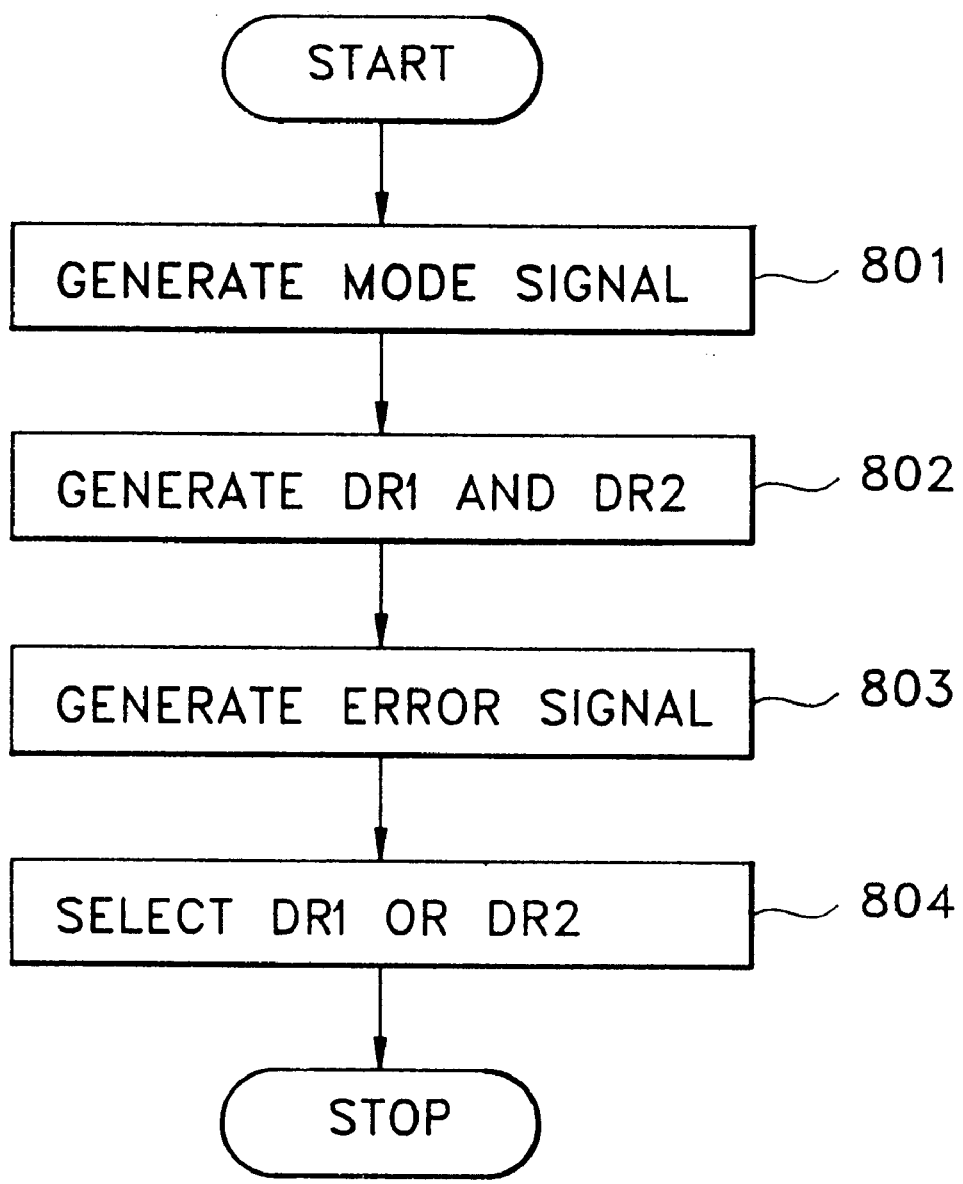
FIG. 8 is a flow chart illustrating at driving method for light source element, according to still another embodiment of the present invention.

FIG. 8 is a flow chart illustrating at driving method for a light source element, according to still another embodiment of the present invention. Step 801 is for generating a mode signal M representing whether the user-selected mode is the read mode or the write mode. Step 802 generates a first drive signal DR1 and a second drive signal DR2. Here, the first drive signal DR1 is one based on the read-mode reference power data when the mode signal M indicates the read mode, and on the write-mode reference power data when the mode signal M indicates the write mode. Meanwhile, the second driving signal DR2 is one based on the reference power data for the read mode irrespective of the selected mode by a user. Step 803 is for generating an error signal ER, wherein the error signal ER is converted into an active state when the tracking error signal TE is higher than the first level or lower than the second level. Step 804 selects between the first driving signal DR1 and the second driving signal DR2 generated in step 802, so as to apply the selected one to the light source element. If the error signal ER is active, the second driving signal DR2 is selected and if the error signal ER is nonactive, the first driving signal DR1 is selected.

Figure 9:
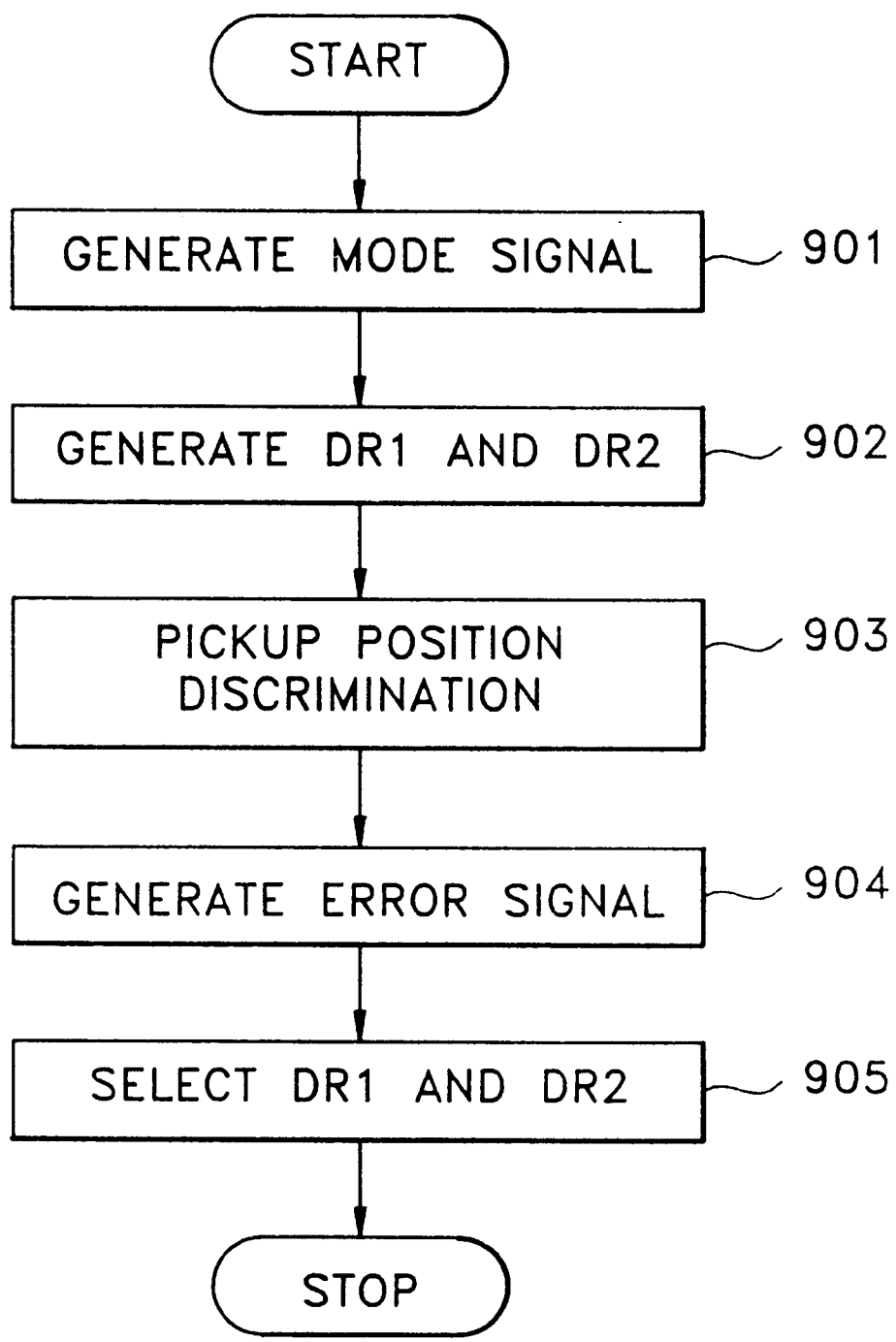
FIG. 9 is a flow chart illustrating a driving method for light source element, according to still another embodiment of the present invention.

FIG. 9 is a flow chart illustrating a driving method for light source element according to still another embodiment of the present invention. In FIG. 9, step 901 and step 902 are equivalent to step 801 and step 802 of FIG. 8. Step 903 is for discriminating whether the optical pickup is located at the desired position. The discrimination is accomplished by detecting the address from the data read out from the optical disc and determining whether the detected address is the desired address, so as to produce a reset signal which is active when the detected address is the desired address. Step 904 is for generating the error signal ER, wherein the error signal ER becomes active when the reset signal is nonactive and the tracking signal is higher than the first level or lower than the second level, and returns to a nonactive state when the reset signal is active. Step 905 selects between the first driving signal DR1 and the second driving signal DR2 generated in step 902, based on the error signal ER. If the error signal ER is active, the second driving signal DR2 is selected. Otherwise, the first driving signal DR1 is selected and applied to the light source element.

Figure 1:
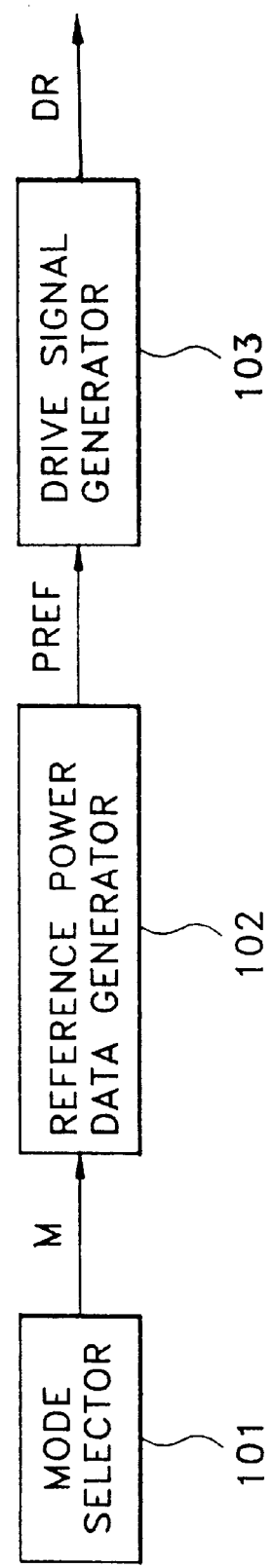
FIG. 1 is a block diagram illustrating a conventional driving apparatus for light source element.
Figure 10:
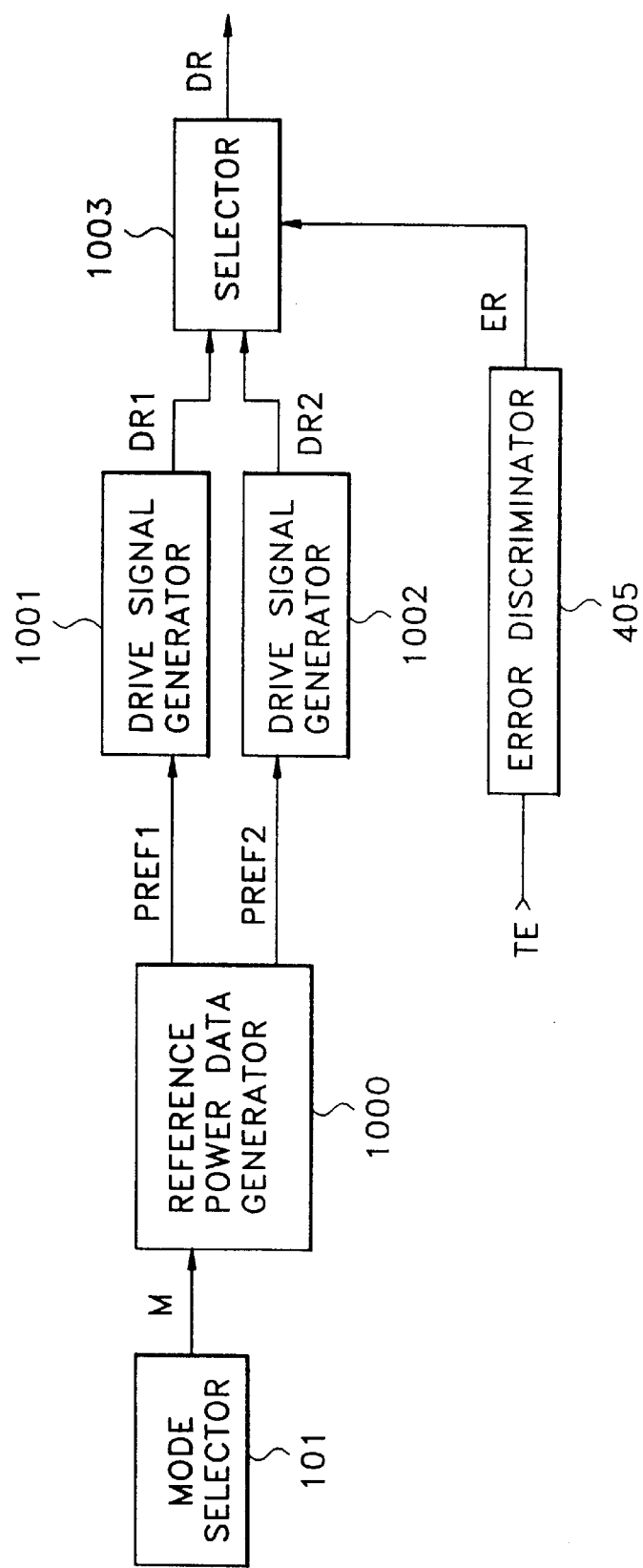
FIG. 10 is a block diagram illustrating a driving apparatus for light source element, according to still another embodiment of the present invention.

FIG. 10 is a block diagram illustrating a driving apparatus for performing the method of FIG. 8 and includes a mode selector 101, a reference power data generator 1000, two drive signal generators 1001 and 1002, a selector 1003 and an error discriminator 405. In FIG. 10, mode selector 101 is equivalent to that of FIG. 1 and error discriminator 405 is equivalent to that of FIG. 4.

The reference power data generator 1000 generates a first reference power data PREF1 and a second reference power data PREF2. The first reference power data is equal to the read reference power data when the mode signal M represents the read mode and is equal to the write reference power data when the mode signal M represents the write mode. Here, the read/write reference power data is detected from the data read out from the optical disc by the optical pickup and is typically recorded in the lead-in area of the disc. Meanwhile, the second reference power data PREF2 is equal to the read reference power data irrespective of the mode signal M.

Drive signal generator 1001 produces a first drive signal DR1 based on the first reference power data PREF1, and drive signal generator 1002 produces a second driving signal DR2 based on the second reference power data PREF2.

Selector 1003 selects the second drive signal DR2 produced from drive signal generator 1002 when the error signal ER is active, and selects the first drive signal DR1 produced from drive signal generator 1001 when the error signal ER is nonactive, so as to apply the selected one to the light source element. Selector 1003 can be constituted by a multiplexer.

Figure 11:
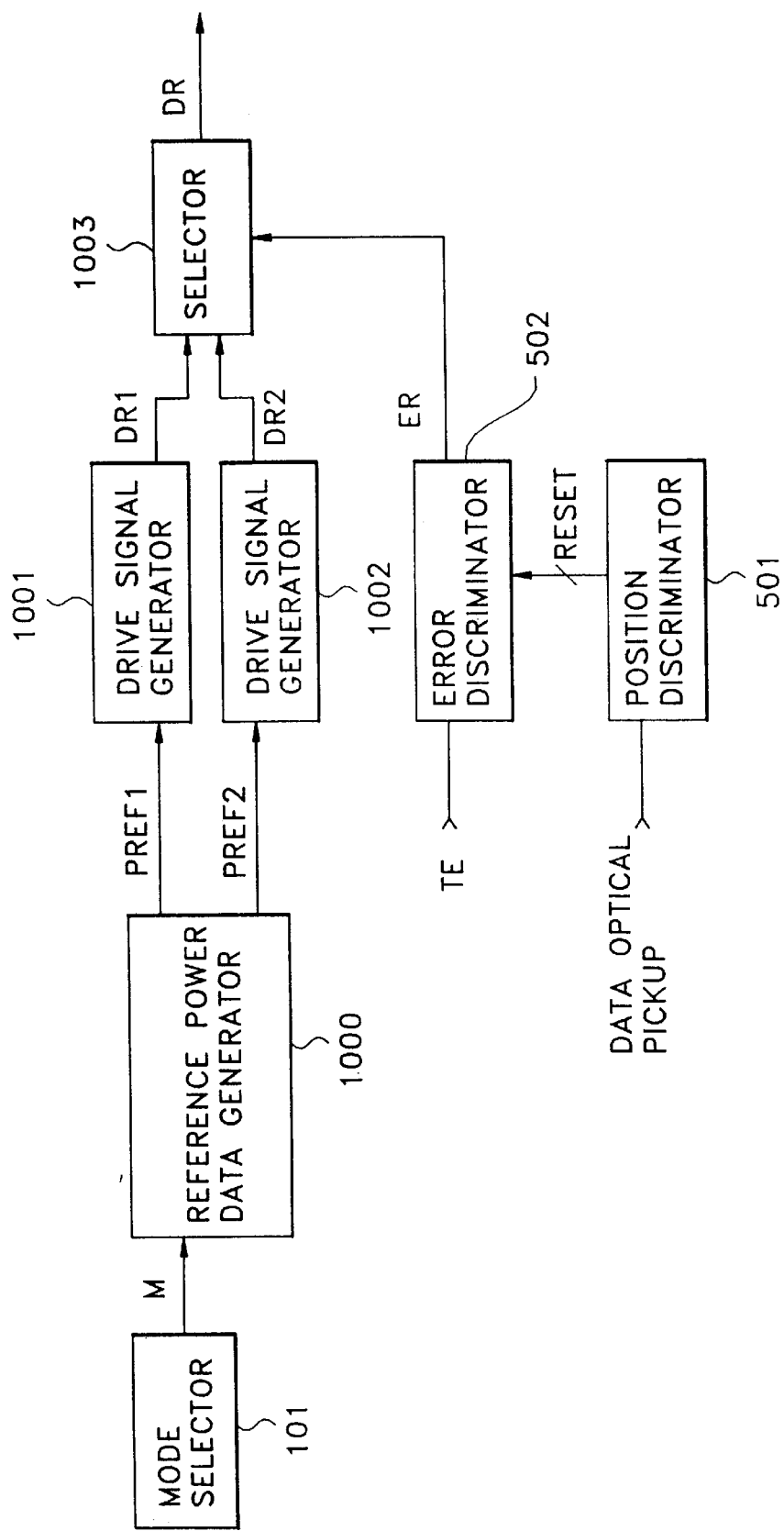
FIG. 11 is a block diagram illustrating a driving apparatus for light source element, according to still another embodiment of the present invention.

FIG. 11 is a block diagram illustrating a driving apparatus for performing the method of FIG. 9 and includes a mode selector 101, a reference power data generator 1000, two drive signal generators 1001 and 1002, a selector 1003, an error discriminator 502 and position discriminator 501. In FIG. 11, mode selector 101, reference power data generator 1000, two driving signal generators 1001 and 1002 and selector 1003 are equivalent to those in FIG. 10, and the operation of position discriminator 501 and error discriminator 502 is equivalent to that explained with respect to FIG. 5.

Thus, in FIG. 11, the driving signal DR produced from selector 1003 is equal to the first driving signal DR1 when the reset signal is nonactive and the tracking error signal TE is higher than the first level or lower than the second level. Otherwise, driving signal DR is equal to the second driving signal DR2.

As described above, the present invention relates to the driving method and apparatus for a light source element included in an optical pickup, which minimizes the error of an optical pickup located at an undesired position due to an abnormal tracking error.

What is claimed is:

1. A driving apparatus for a light source element included in an optical pickup for reading and writing data from and to an optical disc, comprising:

a mode selector for generating a mode signal corresponding to a user-selected read/write mode;

a reference power data generator for detecting write reference power data and read reference power data from data read from said optical disc and for outputting the detected data;

a first drive signal generator for generating a reading drive signal based on said read reference power data;

a second drive signal generator for generating a writing drive signal based on said write reference power data;

an error discriminator for receiving a tracking error signal generated in accordance with the movement of the optical pickup, and for generating an error signal which is active when an abnormal tracking error occurs; and a selector for selecting the reading drive signal if the error signal is active and otherwise selecting between the reading drive signal and the writing drive signal based on the mode signal, and supplying the light source element with the selected drive signal, wherein the reading drive signal causes the optical pickup to be operated at a power level suitable for reading data, and the writing drive signal causes the optical pickup to be operated at a power level suitable for writing data;

wherein said selector comprises:

a logic operator for receiving the error signal and the mode signal to produce a selecting signal; and a multiplexer for selecting one between the outputs of said first and second drive signal generators in accordance with the output of said logic operator.

* * * * *